M. PAGE.
CONDIMENT HOLDER.
APPLICATION FILED MAR. 2, 1917.

1,252,159.

Patented Jan. 1, 1918.

WITNESSES
H.S. Huggins
Edward Yager

INVENTOR
Michael Page.
BY Victor J. Evans
ATTORNEY

UNITED STATES PATENT OFFICE.

MICHAEL PAGE, OF SCHUYLKILL HAVEN, PENNSYLVANIA.

CONDIMENT-HOLDER.

1,252,159.  Specification of Letters Patent.  Patented Jan. 1, 1918.

Application filed March 2, 1917.  Serial No. 152,105.

*To all whom it may concern:*

Be it known that I, MICHAEL PAGE, a citizen of the United States, residing at Schuylkill Haven, in the county of Schuylkill and State of Pennsylvania, have invented new and useful Improvements in Condiment-Holders, of which the following is a specification.

This invention comprehends the provision of a condiment holder embodying a rotatably mounted agitating element, capable of being easily and conveniently rotated when desired, with a view of breaking and loosening the salt contained within the holder, to permit of a ready discharge of the contents from the holder in the usual manner.

More specifically stated, the invention provides an agitator fixedly secured to a cap and loosely mounted upon the bottom of the condiment holder whereby upon turning of the cap the agitator is manipulated for the above mentioned purposes, the agitator being constructed and arranged to permit of its use with condiment holders of different designs.

The nature and advantages of the invention will be better understood when the following detail description is read in connection with the accompanying drawing, the invention residing in the construction, combination and arrangement of parts as claimed.

In the drawing forming part of this specification like numerals of reference indicate similar parts in the several views and wherein:—

Figure 1:
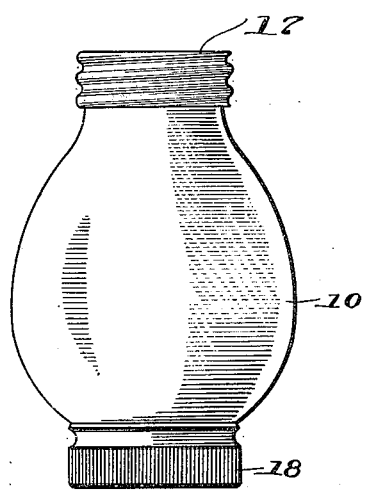
Figure 1 is an elevation of a condiment holder constructed in accordance with the invention.

Referring to the drawing in detail the body of the condiment holder is indicated at 10, and the mouth is preferably threaded at 11 to threadedly accommodate the perforated cap 12 in the usual well known manner. The condiment holder may be constructed from any suitable material and design, as the holder itself does not form any part of the invention. The bottom 12 of the holder is preferably provided with a depression 13, and a centrally disposed opening 14 to accommodate the agitator to be presently described.

Figure 3:
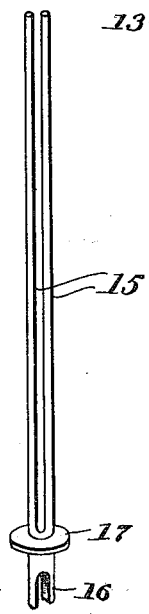
Fig. 3 is a view of the agitating element in its original form.

The agitator as shown in this particular instance preferably embodies an elongated member split longitudinally for the major portion of its length to provide spaced parallel limbs 15, considering the agitator in its original form as shown in Fig. 3. The agitator may be constructed from any suitable material, and has its opposite end bifurcated to provide the separated portions 16.

Figure 2:
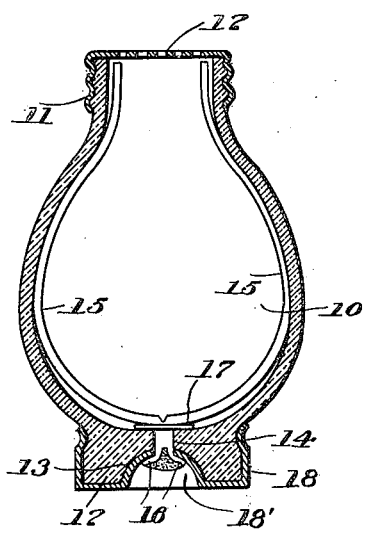
Fig. 2 is a vertical sectional view taken therethrough.

As shown in Fig. 2, the agitator is arranged within the condiment holder 10 in a vertical position, with its lower end passing through the opening 14 in the bottom. The agitator is constructed from material to permit of the limbs 12 being readily separated and shaped to conform to the configuration of the particular design of holder with which it is employed. A washer 17 is fitted upon the agitator, and adapted to surround the opening 14 to prevent leakage of the contents of the holder at this point. Prior to the introduction of the agitator into the holder 10, a cap 18 designed to conform to the configuration of the bottom is loosely fitted upon the latter, the bottom of the cap being instruck as at 18 to engage against the depression 13 of the bottom, while the cap is further provided with an opening registering with the opening 14 in the bottom. When the agitator is positioned within the holder in the manner above stated, the lower extremity projects through the opening in the cap, and the separated portions 16 defined by the bifurcation of this end of the agitator, are then spread apart, and soldered or otherwise suitably secured to the instruck portion of the cap. The cap is mounted upon the bottom for rotation, and it is manifest that when the cap is thus adjusted, the limbs of the agitator will be simultaneously rotated within the holder. It is of course understood that the agitator is primarily intended to break and granulate the lumps of salt or the like contained in the condiment holder, so that the same can be readily and easily sprinkled through the perforations in the cap 11 in the ordinary and well known manner.

While it is believed that from the foregoing description the nature and advantages of the invention will be readily apparent, I desire to have it understood that what is herein shown and described constitutes one and the preferred embodiment of the invention to which I do not limit myself, and that such changes in the construction and arrangement of parts may be resorted to when desired as fall within the scope of what is claimed.

What is claimed is:—

A condiment holder comprising a receptacle having a depression in the bottom thereof and an opening intersecting said depression, an agitating element comprising an elongated member split longitudinally for a portion of its length throughout one end to provide spaced parallel limbs, a disk fixed to said member adjacent the closed extremity of the split portion, the remaining portion of the agitating element beneath said disk being passed through said opening in the bottom, whereby said disk rests upon the bottom surrounding said opening, the said parallel limbs being separated at their free extremities, whereby said limbs may be shaped to accommodate themselves to the receptacle to engage the inner surface thereof, the opposite ends of said agitating element being bifurcated, a cap fitted upon the bottom for rotation and having an instruck portion fitted within the depression of the bottom, and the separated portions of said element defined by the bifurcation being spread and secured to the instruck portion of the cap as and for the purpose described.

In testimony whereof I affix my signature.

MICHAEL PAGE.